United States Patent
Nakaoka et al.

(10) Patent No.: US 9,704,454 B2
(45) Date of Patent: Jul. 11, 2017

(54) DISPLAY CONTROL DEVICE AND METHOD INCLUDING SUPERIMPOSING A FOCUS ON A SPECIFIC OBJECT THAT IS TO BE CLOSEST TO A PREDETERMINED POSITION WHEN SCROLLING STOPS AND SCROLLING THE FOCUS AND A DISPLAYED AREA SIMULTANEOUSLY

(75) Inventors: Hideaki Nakaoka, Osaka (JP); Tatsuto Horibe, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 119 days.

(21) Appl. No.: 14/362,141

(22) PCT Filed: May 30, 2012

(86) PCT No.: PCT/JP2012/003544
§ 371 (c)(1),
(2), (4) Date: Jun. 2, 2014

(87) PCT Pub. No.: WO2013/099046
PCT Pub. Date: Jul. 4, 2013

(65) Prior Publication Data
US 2014/0333675 A1  Nov. 13, 2014

(30) Foreign Application Priority Data
Dec. 26, 2011  (JP) .................................. 2011-284214

(51) Int. Cl.
G09G 5/34 (2006.01)
G06F 3/0485 (2013.01)
G09G 5/377 (2006.01)

(52) U.S. Cl.
CPC ............. *G09G 5/34* (2013.01); *G06F 3/0485* (2013.01); *G09G 5/377* (2013.01)

(58) Field of Classification Search
CPC .... G06F 3/0485; G06F 3/0488; G06F 3/0482; G09G 5/34
See application file for complete search history.

(56) References Cited

U.S. PATENT DOCUMENTS 8,375,334 B2    2/2013  Nakano et al.
2004/0100479 A1  5/2004  Nakano et al.
(Continued)

FOREIGN PATENT DOCUMENTS

JP    10-021036    1/1998
JP    2003-330613  11/2003
(Continued)

OTHER PUBLICATIONS

International Search Report issued Jul. 10, 2012 in International (PCT) Application No. PCT/JP2012/003544.

*Primary Examiner* — Maurice L McDowell, Jr.
(74) *Attorney, Agent, or Firm* — Wenderoth, Lind & Ponack, L.L.P.

(57) ABSTRACT

A display control device including: an input control unit which receives a scrolling start indication and a scrolling stop indication from a user; a scrolling control unit which, if the scrolling stop indication is received, decelerates a scroll rate by a predetermined function and pre-calculates a location of a displayed area when the scrolling of the displayed area stops; and a focus control unit which superimposes a focus on an object closest to a predetermined position within the displayed area at any time from when the location of the displayed area when the scrolling stops is determined to when the scrolling stops, the focus representing that the object is being selected.

7 Claims, 14 Drawing Sheets

(56) References Cited

U.S. PATENT DOCUMENTS

| | | |
|---|---|---|
| 2005/0097479 A1 | 5/2005 | Takabe et al. |
| 2007/0136286 A1 | 6/2007 | Webster et al. |
| 2009/0204920 A1* | 8/2009 | Beverley ............... G06T 3/4038 715/768 |
| 2011/0302532 A1* | 12/2011 | Missig .................. G06F 3/0416 715/823 |
| 2012/0089942 A1* | 4/2012 | Gammon ............... G06F 3/048 715/784 |

FOREIGN PATENT DOCUMENTS

| | | |
|---|---|---|
| JP | 2005-122422 | 5/2005 |
| JP | 2007-157145 | 6/2007 |
| JP | 2008-226101 | 9/2008 |

* cited by examiner

FIG. 13
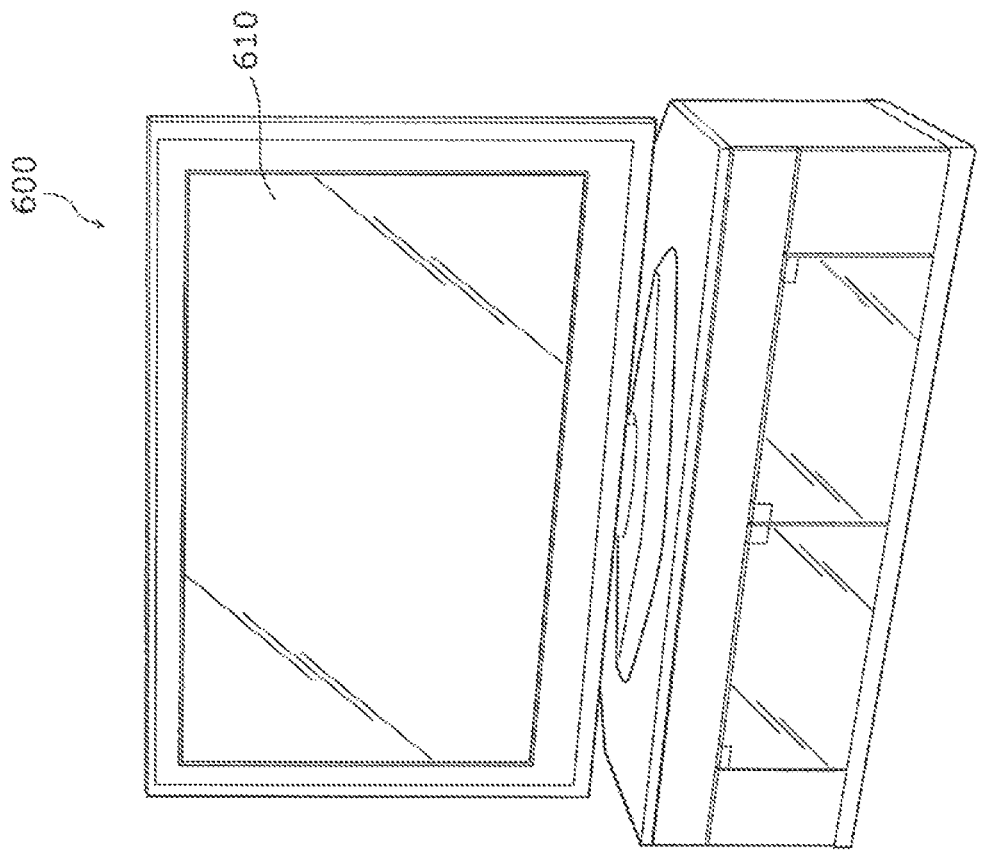
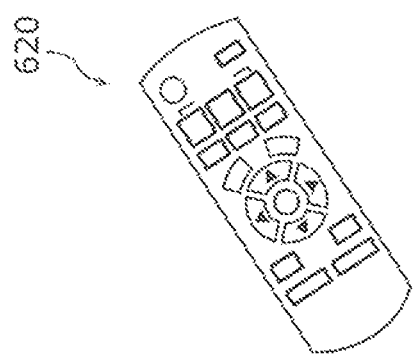

DISPLAY CONTROL DEVICE AND METHOD INCLUDING SUPERIMPOSING A FOCUS ON A SPECIFIC OBJECT THAT IS TO BE CLOSEST TO A PREDETERMINED POSITION WHEN SCROLLING STOPS AND SCROLLING THE FOCUS AND A DISPLAYED AREA SIMULTANEOUSLY

TECHNICAL FIELD

The present invention relates to a display control device and a display control method which display content on a display device.

BACKGROUND ART

For example, as a conventional scroll control method, Patent Literature (PTL) 1 discloses an information processing device which displays image information including objects such as hyperlinks, on a display screen in a scrollable manner.

When an object, which is focused on a display screen after scrolling the image information, is no longer displayed, the information processing device disclosed in PTL 1 issues a dummy signal of a directional key for moving the focus downwardly, to move the focus to an object in the screen.

CITATION LIST

Patent Literature

[PTL 1] Japanese Unexamined Patent Application Publication No. H10-021036

SUMMARY OF INVENTION

Technical Problem

In the conventional information processing device disclosed in PTL 1, however, a mark representing the focus moves frequently on the screen upon fast scrolling, causing a problem that it is difficult for a user to read information on the screen. The conventional information processing device also has a problem that it is difficult for a user to recognize a focus position on the scrolled display screen.

The present invention is made in view of the above problems, and has an object to provide a display control device and a display control method which make information on the screen more readable and the focus position more recognizable even at fast scrolling.

Solution to Problem

To achieve the above object, a display control device according to one aspect of the present invention is a display control device for displaying a displayed area on a display screen, the displayed area being a portion of content including a plurality of objects respectively associated with predetermined processes, the display control device including: an instruction receiving unit configured to receive, from a user, a scrolling start indication for starting scrolling of the displayed area which is a process of sliding the displayed area on the content, and a scrolling stop indication for stopping the scrolling; a scrolling control unit configured to decelerate a scroll rate by a predetermined function and pre-calculate a location of the displayed area when the scrolling stops, if the instruction receiving unit receives the scrolling stop indication during the scrolling; and a focus control unit configured to superimpose a focus on an object, among the plurality of objects, that is closest to a predetermined position within the displayed area, at any time from when the scrolling control unit determines the location of the displayed area when the scrolling stops to when the scrolling stops, the focus representing that the object is being selected.

These general and specific aspects may be implemented using a system, a method, an integrated circuit, a computer program, or a computer-readable recording medium such as a CD-ROM, or any combination of systems, methods, integrated circuits, computer programs, or computer-readable recording media,

Advantageous Effects of Invention

According to the present invention, a display control device and a display control method which facilitate recognizing the focus position when the scrolling stops can be provided.

BRIEF DESCRIPTION OF DRAWINGS

FIG. 13 is a diagram showing application of the embodiment.

DESCRIPTION OF EMBODIMENTS

Figure 1:
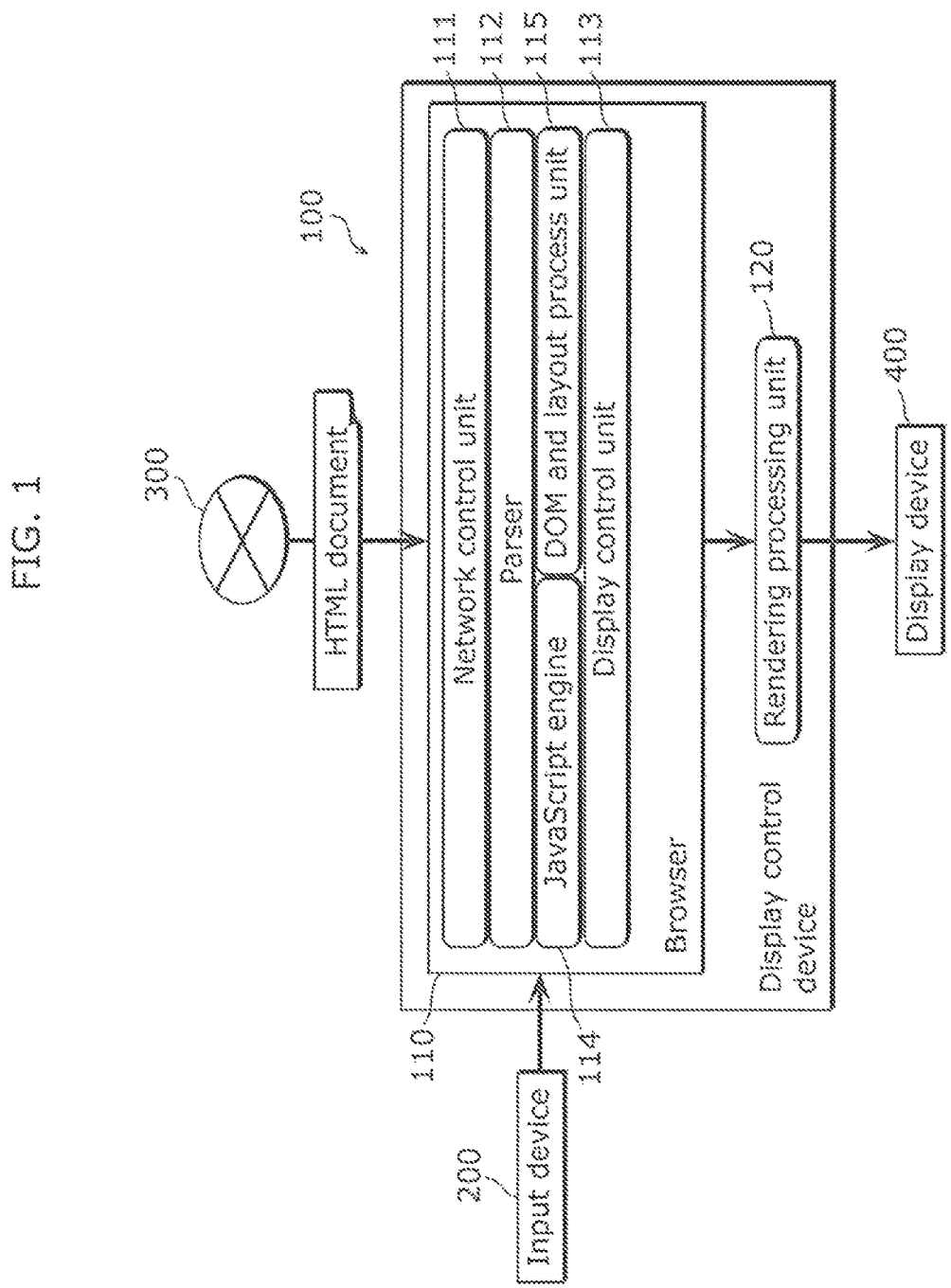
FIG. 1 is a functional block diagram of a display control device according to an embodiment of the present invention.

A display control device according to one aspect of the present invention is a display control device for displaying a displayed area on a display screen, the displayed area being a portion of content including a plurality of objects respectively associated with predetermined processes, the display control device including: an instruction receiving unit configured to receive, from a user, a scrolling start indication for starting scrolling of the displayed area which is a process of sliding the displayed area on the content, and a scrolling stop indication for stopping the scrolling; a scrolling control unit configured to decelerate a scroll rate by a predetermined function and pre-calculate a location of the displayed area when the scrolling stops, if the instruction receiving unit receives the scrolling stop indication during the scrolling; and a focus control unit configured to superimpose a focus on an object, among the plurality of objects, that is closest to a predetermined position within the displayed area, at any time from when the scrolling control unit determines the location of the displayed area when the scrolling stops to when the scrolling stops, the focus representing that the object is being selected.

According to the above configuration, if the scrolling stop indication is received from the user, the scrolling is decelerated by the predetermined function and then stopped, rather than being immediately stopped. Thus, information on the screen is made more readable. Furthermore, according to the above configuration, the focus after the scrolling stops is set, every time, on an object that is located on the periphery of a "predetermined position within the displayed area," Thus, it makes a position of the focus after the scrolling stops more recognizable to the user. Furthermore, according to the above configuration, the focus is set, during deceleration of the scrolling, on 'an object located in the periphery of the "predetermined position" after the scrolling stops,' and the focus is rendered once the object appears on the screen. Thus, the information on the screen is made more readable and the focus position is more recognizable to the user.

Moreover, the focus control unit may display the focus at an edge of the display screen at any time from when the scrolling control unit determines the location of the displayed area when the scrolling stops to when the scrolling stops, and gradually bring the focus to the object so that the focus is superimposed on the object when the scrolling stops.

By performing, during the deceleration of the scrolling, such animation display which gradually brings the focus from an edge of the screen to the object, a fact that the focus is moving to the object from the focus position before the start of the scrolling is made more recognizable to the user, and furthermore, the animation display makes the focus position after the scrolling stops more recognizable to the user. Moreover, an object to be focused is not frequently changed and rendered in the animation display. Thus, the user is not obstructed from reading information on the screen. Moreover, in the animation display, the animation completes during the deceleration of the scrolling, Thus, information related to the movement and position of the focus is more quickly made recognizable to the user, thereby allowing it easier for the user to perform quick operation with less stress.

Moreover, when the instruction receiving unit receives the scrolling start indication, the scrolling control unit may start the scrolling and gradually accelerate a scroll rate to a predetermined rate.

This allows quick arrival at a destination even if content much larger than the display screen is displayed.

Moreover, the instruction receiving unit may receive the scrolling start indication by the user depressing and holding a directional key on an operating device for a predetermined time period, and receive the scrolling stop indication by the user releasing the directional key, and the scrolling control unit may scroll the displayed area in a direction indicated by the directional key.

By assigning a plurality of indications to the same key as such, each process can be performed by simple and intuitive operation.

Furthermore, the instruction receiving unit may further receive a focus movement indication for moving the focus, by the user depressing the directional key for less than the predetermined time period, and if the instruction receiving unit receives the focus movement indication, the focus control unit may move the focus from, among a plurality of objects included in the displayed area, a first object currently having the focus superimposed thereon to a second object adjacent to the first object in a direction indicated by the directional key.

By allowing the user to perform the focus movement process and the scrolling process as separately processes as such, smooth scrolling of the displayed area can be achieved even if a large number of objects are included in content.

Moreover, the predetermined position may be a center of the displayed area.

A display control method according to one aspect of the present invention is a display control method for displaying a displayed area on a display screen, the displayed area being a portion of content including a plurality of objects respectively associated with predetermined processes, the display control method including: (a) receiving, from a user, a scrolling start indication for starting scrolling of the displayed area which is a process of sliding the displayed area on the content, and a scrolling stop indication for stopping the scrolling; (b) decelerating a scroll rate by a predetermined function and pre-calculating a location of the displayed area when the scrolling stops, if the scrolling stop indication is received during the scrolling in step (a); and (c) superimposing a focus on an object, among the plurality of objects, that is closest to a predetermined position within the displayed area, at any time from when the location of the displayed area when the scrolling stops is determined in step (b) to when the scrolling stops, the focus representing that the object is being selected.

These general and specific aspects may be implemented using a system, a method, an integrated circuit, a computer program, or a computer-readable recording medium such as a CD-ROM, or any combination of systems, methods, integrated circuits, computer programs, and computer-readable recording media.

Hereinafter, a display control device and a display control method according to the present invention will be described, with reference to the accompanying drawings. Each of the embodiments described below shows a general or specific example. Values, shapes, materials, components, disposition or a form of connection between the components, steps, and the order of the steps are merely illustrative, and are not intended to limit the present invention. Therefore, among the components in the following embodiments, components not recited in any one of the independent claims are described as arbitrary components. It should be noted that figures are schematic views and do not necessarily illustrate the present invention precisely.

(Embodiment)

Figure 2:
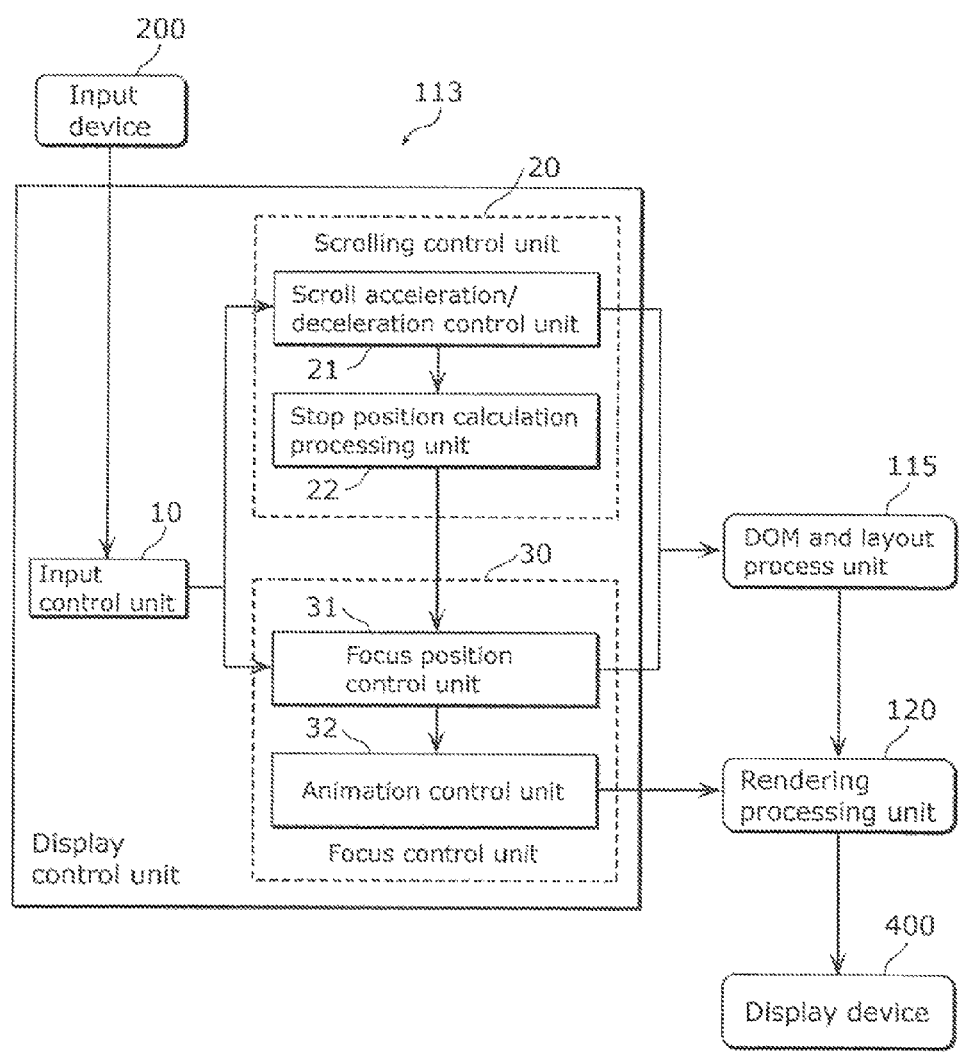
FIG. 2 is a functional block diagram of a display control unit according to an embodiment of the present invention.

The configuration of a display control device 100 according to an embodiment of the present invention will be described, with reference to FIGS. 1 and 2, FIG. 1 is a functional block diagram of the display control device 100 according to one embodiment of the present invention. FIG. 2 is a functional block diagram of a display control unit 113 according to one embodiment of the present invention.

The display control device 100 includes, as FIG. 1 shows, a browser 110 and a rendering processing unit 120, The browser 110 includes a network control unit 111, a parser 112, the display control unit 113, a JavaScript (registered trademark) engine 114, and a DOM and layout process unit 115.

The network control unit 111 obtains content from a server through a communication network 300 or the like such as the Internet. Hereinafter, a hypertext markup language (HTML) document will be described by way of example of the content obtained by the network control unit 111. However, the content according to the present invention is not limited thereto.

An HTML document obtained by the network control unit 111 contains a plurality of objects such as links, text boxes, and buttons. Each object is associated with a predetermined process. For example, a link is associated with a process for transition to another page. A text box is associated with a process of permitting a user to input a string. A button is associated with a process of permitting (OK button) or cancelling (cancel button) continuation of a process.

The parser 112 parses the HTML document obtained by the network control unit 111. The JavaScript (registered trademark) engine 114 executes a JavaScript (registered trademark) included in the HTML document parsed by the parser 112.

The display control unit 113 displays the HTML document, obtained by the network control unit 111, on a display device 400 through the rendering processing unit 120.

The display control unit 113 controls a display by the display device 400, based on user instructions inputted to an input device (an operating device) 200, Specific processing of the display control unit 113 will be described below, with reference to FIG. 2.

The DOM and layout process unit 115 creates a document object model (DOM) tree of the HTML document parsed by the parser 112. In the DOM tree, objects included in the HTML document are organized in a tree structure. The DOM and layout process unit 115 calculates where each of the objects included in the DOM tree in the HTML document is to be arranged, and determines objects that needs to be rendered on a display screen.

The rendering processing unit 120 displays the HTML document on the display device 400, based on instructions from the browser 110.

The input device 200 receives input from a user. The input device 200 corresponds to, for example, a remote controller of a television, a keyboard of a personal computer (PC) or mobile phone.

The display device 400 displays the HTML document obtained by the network control unit 111. Specific configuration of the display device 400 is not particularly limited. For example, a liquid crystal display, a plasma display, or an organic electro luminescence (EL) display may be employed.

It should be noted that the HTML document obtained by the network control unit 111 is larger in size than a size that can be displayed on the display device 400 at once. Thus, a limited portion of the HTML document (hereinafter, denoted as a "displayed area") can be displayed on the display device 400.

Thus, the above-described display control unit 113 controls which portion of the HTML document is to be displayed on the display device 400, based on the user instruction. To do so, the display control unit 113 includes, as shown in FIG. 2, an input control unit 10, a scrolling control unit 20, and a focus control unit 30.

The input control unit (an instruction receiving unit) 10 receives operational instructions from the user which are input to the input device 200. Specific examples of operational instructions correspond, although not particularly limited to, a focus movement indication, a scrolling start indication, a scrolling stop indication, and so on.

It should be noted that the focus movement indication is an instruction which requests for moving a focus displayed on the display device 400. The focus is superimposed on one of objects displayed on the display device 400, indicating that the object is being selected (a state where a process associated with the object is executed by the user depressing a determination key).

The scrolling start indication is an instruction which requests for sliding (hereinafter, denoted as "scrolling") the displayed area of the HTML document. In other words, once the scrolling start indication is input, the display of the display device 400 continuously changes. Furthermore, the scrolling stop indication is an instruction which requests for stopping the scrolling process initiated by the scrolling start indication. In other words, the scrolling stop indication is received only during the scrolling process.

It should be noted that a user can use the same key on the input device 200 to input the focus movement indication, the scrolling start indication, and the scrolling stop indication. For example, the input control unit 10 may receive the focus movement indication by the user depressing a directional key for less than a predetermined time period (hereinafter, denoted as "short press"), receive the scrolling start indication by the user depressing and holding the directional key on the input device 200 for the predetermined time period (hereinafter, denoted as "long press"), and receive the scrolling stop indication by the user releasing the directional key.

The input device 200 transmits a signal to the input control unit 10 upon a change of a key-depressed state, for example. In other words, upon depression of a key, the input device 200 transmits to the input control unit 10 that a signal (hereinafter, denoted as a "press signal") which indicates the key press, and upon release of the key, the input device 200 transmits to the input control unit 10 a signal (hereinafter, denoted as a "release signal") which indicates the key release.

Then, the input control unit 10 measures a duration (hereinafter, denoted as "press duration") from the receipt of the press signal to the receipt of the release signal. Then, if the press duration is less than a threshold (for example, 0.5 second), the input control unit 10 determines the user operation to be "short press." On the other hand, if the press duration is greater than or equal to the threshold, the input control unit 10 determines the user operation to be "long press." It should be noted that the above determination method is merely illustrative and the present invention is not limited thereto.

The scrolling control unit 20 includes a scroll acceleration/deceleration control unit 21 and a stop position calculation processing unit 22 to continuously vary (scroll) the displayed area to be displayed on the display device 400 of the HTML document, according to the scrolling start indication and the scrolling stop indication input from the user.

If the input control unit 10 accepts the scrolling start indication, the scroll acceleration/deceleration control unit 21 starts scrolling the displayed area in a direction indicated by the depressed directional key and gradually accelerates the scroll rate. The acceleration of the scroll rate continues until reaching a predetermined rate or until the scrolling stop indication is input. Then, if the input control unit 10 receives the scrolling stop indication, the scroll acceleration/deceleration control unit 21 gradually decelerates the scroll rate and notifies the stop position calculation processing unit 22 of the current position of the displayed area and the current scroll rate.

The stop position calculation processing unit 22 calculates a position of the displayed area when the scrolling stops, based on the current position of the displayed area and the current scroll rate obtained from the scroll acceleration/deceleration control unit 21. Then, the stop position calculation processing unit 22 notifies the focus position control unit 31 of the calculated position.

The focus control unit 30, to control a position of the focus displayed on the display device 400, includes a focus position control unit 31 and an animation control unit 32. By being superimposed on any of objects included in the HTML document (i.e., the displayed area) which are currently displayed on the display device 400, the focus indicates that the object is in selected state.

If the input control unit 10 receives the focus movement indication, the focus position control unit 31 moves the focus from a first object, on which the focus is currently superimposed, to a second object. It should be noted that the second object is an object adjacent to the first object in a direction indicated by a directional key depressed by the user.

Moreover, at a time the scrolling control unit 20 stops scrolling the displayed area, the focus position control unit 31 superimposes the focus on an object (hereinafter, denoted as a "target object") that is closest to a predetermined position in the displayed area notified by the stop position calculation processing unit 22. It should be noted that the predetermined position is, although typically at the center of the displayed area, not limited thereto, and may be, for example, the top edge or the bottom edge of the displayed area.

The animation control unit 32 displays an animation of the focus on the display screen during a scrolling stop process. The displayed focus is a pseudo-focus which is formed in the same shape as that of the focus and does not have functionality, as the actual focus, of setting the object having the focus superimposed thereon to be in selected state. The animation control unit 32 renders the pseudo-focus, superimposing it on the HTML document rendered by the DOM and layout process unit 115.

Specifically, the animation control unit 32 displays the pseudo-focus at an edge of the display screen upon the input control unit 10 receiving the scrolling stop indication. Then, the animation control unit 32 gradually brings the pseudo-focus close to the target object, so as to superimpose the focus on the target object at a time the displayed area stops scrolling.

Figure 3:
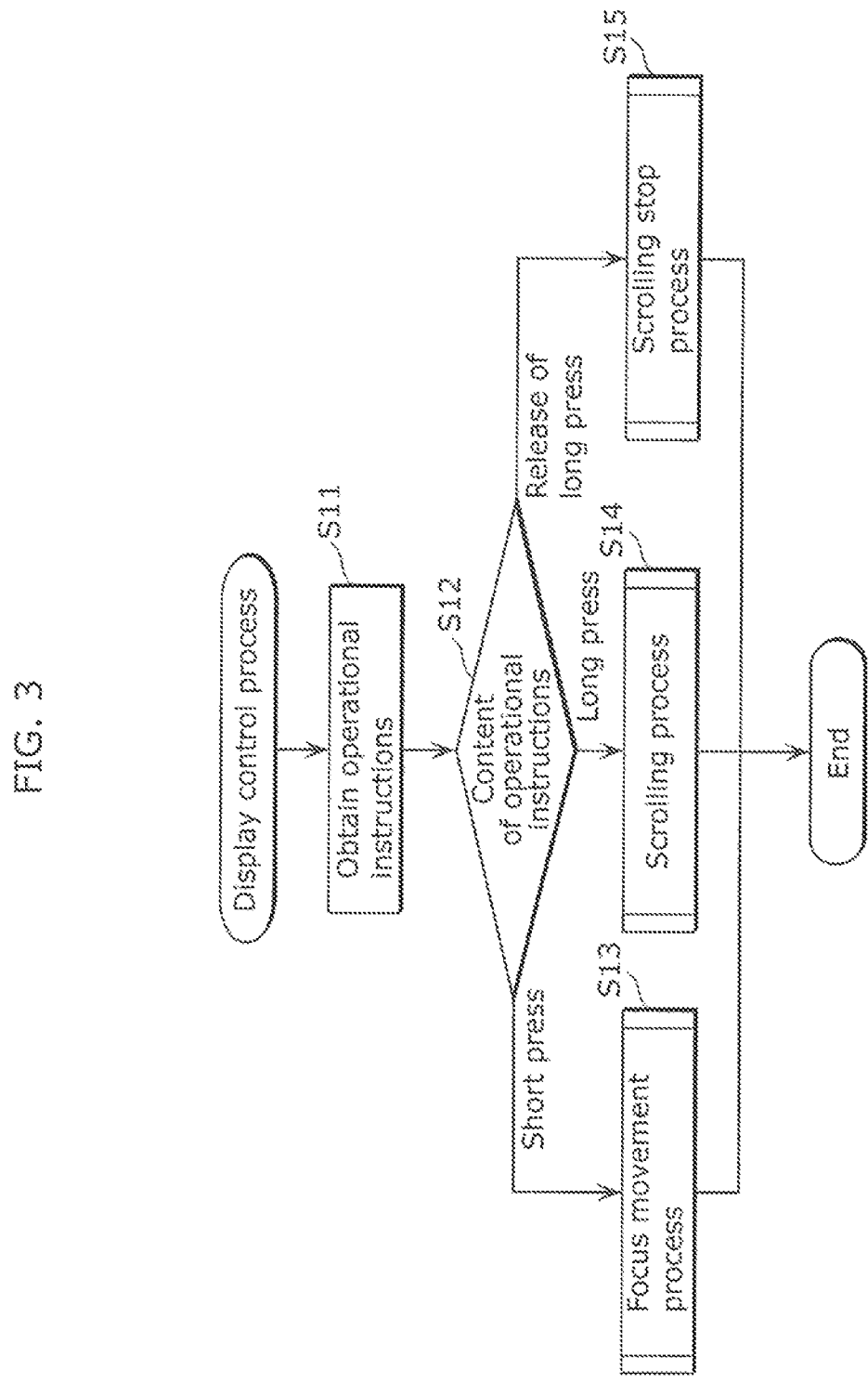
FIG. 3 is a flowchart illustrating operation of the display control device.

Next, operation of the display control device 100 will be described, with reference to FIG. 3. FIG. 3 is a flowchart illustrating operation of the display control device 100.

First, the input control unit 10 obtains operational instructions from the user through the input device 200 (S11). Then, the input control unit 10 determines what the obtained operational instructions are (S12). In the following, the cases where the focus movement indication, the scrolling start indication, and the scrolling stop indication are input will be described.

Figure 4:
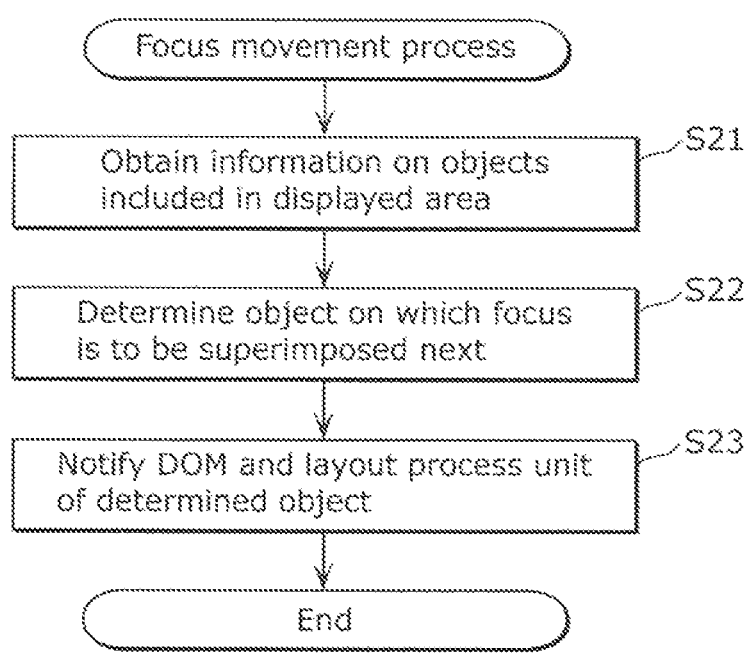
FIG. 4 is a flowchart illustrating a focus movement process.
Figure 5:
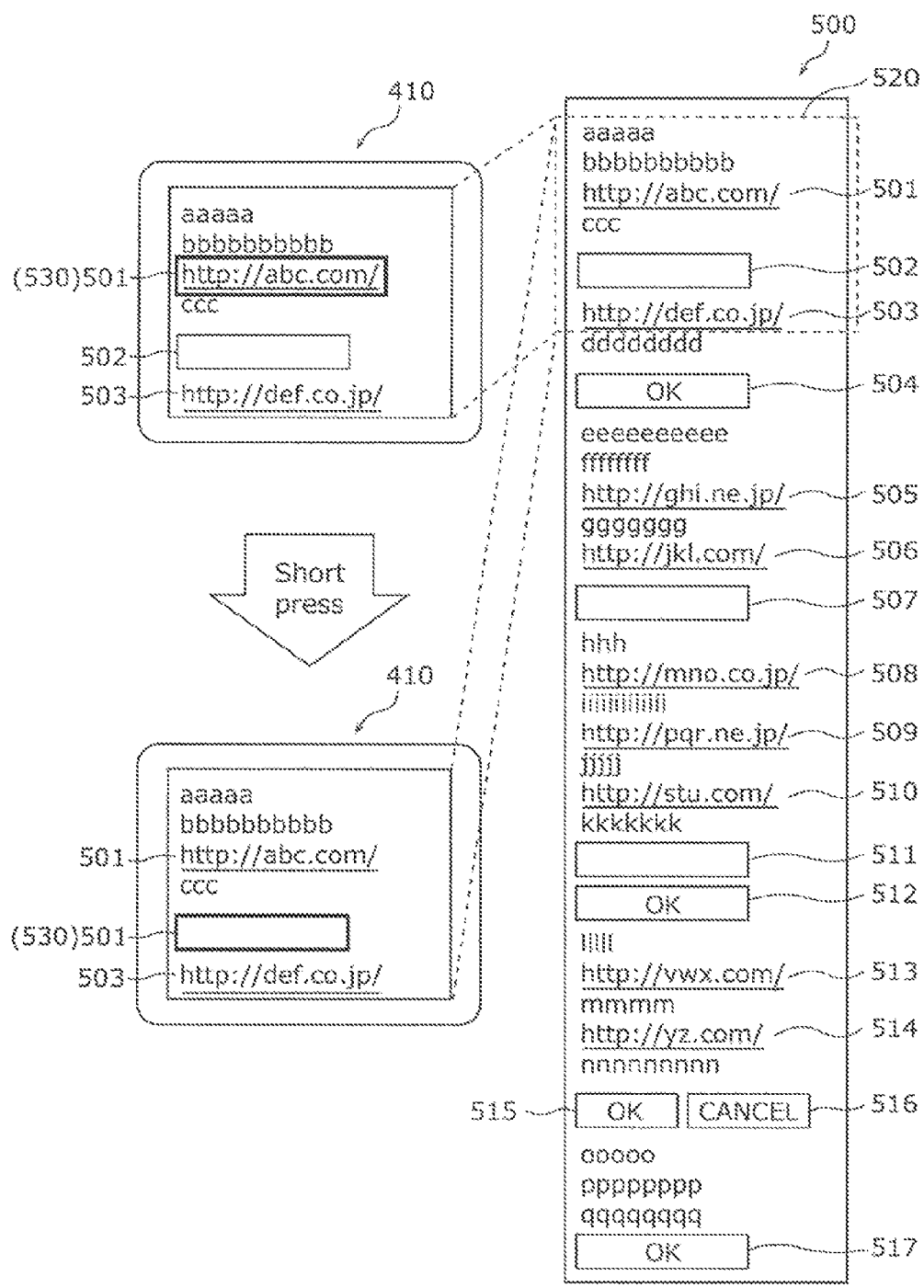
FIG. 5 is a diagram showing an example display when the focus movement process is performed.

If the focus movement indication is input in step S11 (for example, if the directional key on the input device 200 is "short pressed"), the focus movement process is performed (S13). The focus movement process will be described in detail, with reference to FIGS. 4 and 5. FIG. 4 is a flowchart illustrating the focus movement process. FIG. 5 is a diagram showing an example display when the focus movement process is performed.

Content 500 shown in FIG. 5 is larger in size than a display screen 410. Thus, a displayed area 520, of the content 500, which is displayed on the display screen 410 is indicated by the dotted box. Moreover, the content 500 includes a plurality of objects 501, 502, 503, 504, 505, 506, 507, 508, 509, 510, 511, 512, 513, 514, 515, 516, and 517. The objects 501, 503, 505, 506, 508, 509, 510, 513, and 514 are links. The objects 502, 507, and 511 are text boxes. The objects 504, 512, 515, and 516 are buttons. The same is true for the content 500 shown in FIGS. 7 and 10.

Figure 7:
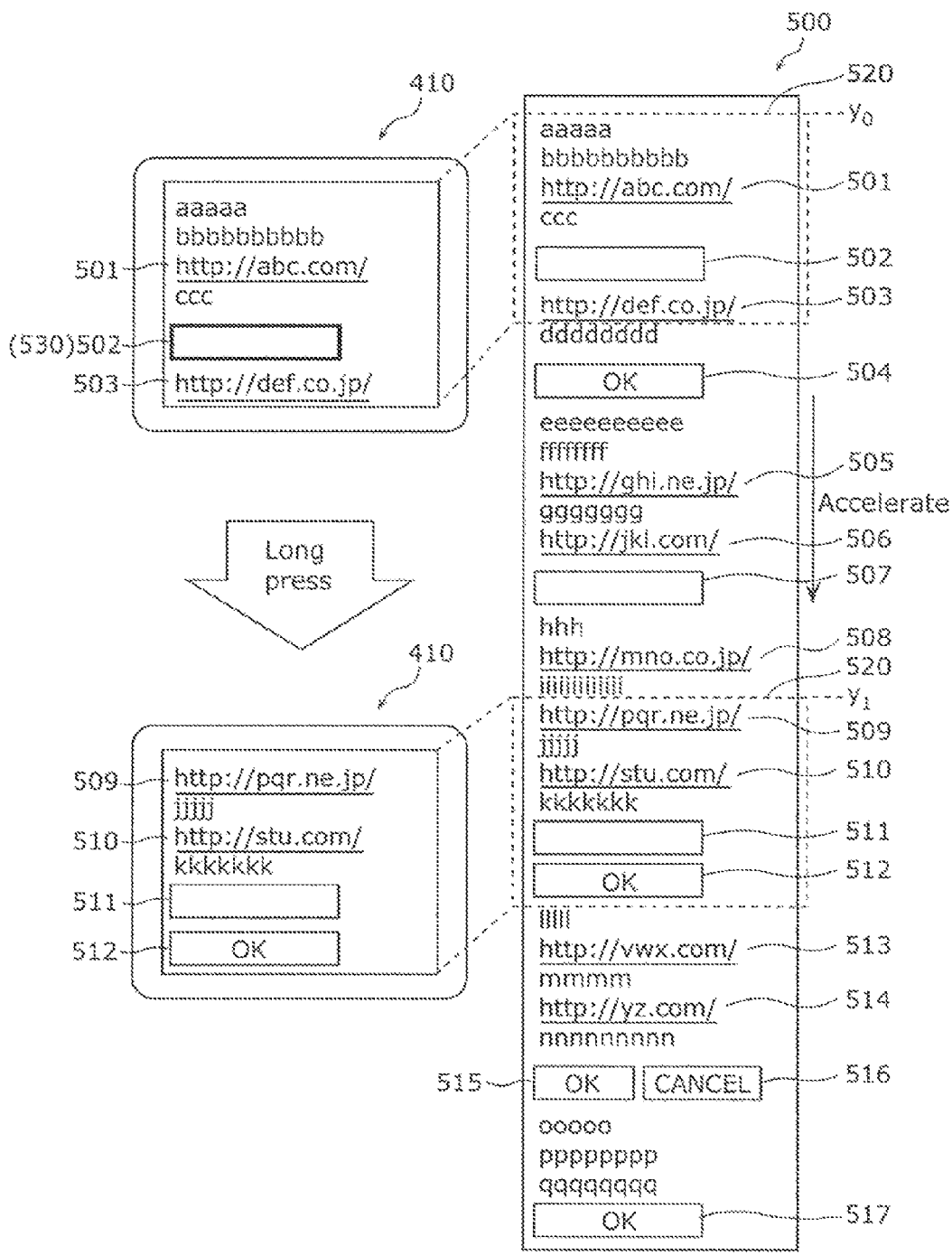
FIG. 7 is a diagram showing an example display when the scrolling process is performed.
Figure 10:
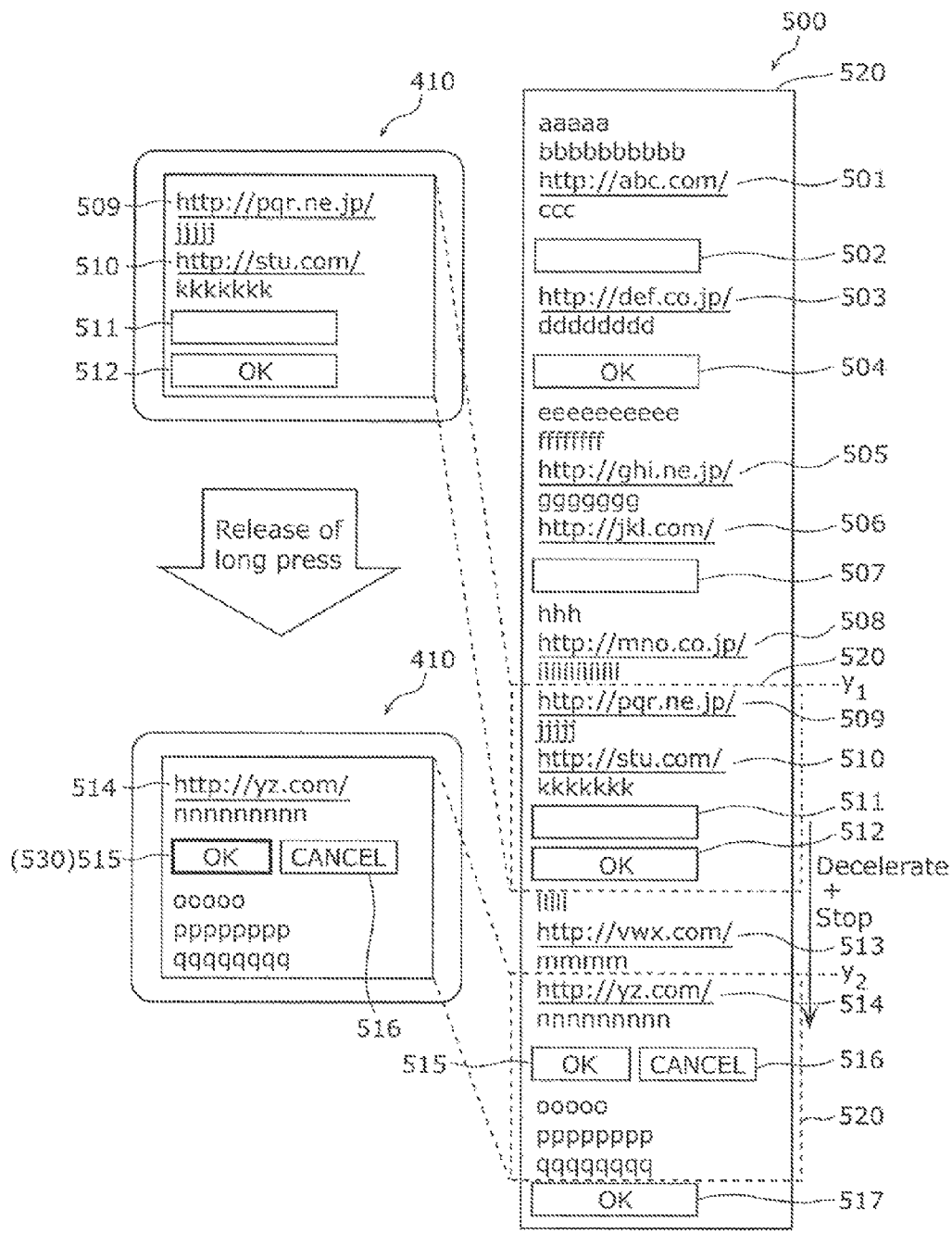
FIG. 10 is a diagram showing an example display when the scrolling stop process is performed.

A focus 530 is illustrated by the thick box in the display screen 410 in FIGS. 5, 7, and 10. However, an example of the focus 530 is not limited thereto and the focus 530 may be displayed, for example, highlighted, in bold face type, or a different color.

First, the focus position control unit 31 obtains information on objects included in the displayed area (S21). For example, if the uppermost portion of the content 500 is the displayed area 520 as illustrated in the display screen 410 on the upper left of FIG. 5, the focus position control unit 31 obtains positions of the objects 501, 502, and 503 and obtains a fact that the focus 530 is superimposed on the object.

The focus position control unit 31 determines an object on which the focus is to be superimposed next (S22). For example, if the down directional key is short pressed in step S11 of FIG. 3, the focus position control unit 31 determines the object 502 which is downwardly adjacent to the object 501 (the first object), which is currently having the focus 530 superimposed thereon, to be an object on which the focus 530 is to be superimposed next (the second object).

Then, the focus position control unit 31 notifies the DOM and layout process unit 115 of identification information of the determined object 502 (S23), and thereby the focus 530 is superimposed on the object 502 as illustrated in the display screen 410 at the bottom left of FIG. 5.

Figure 6:
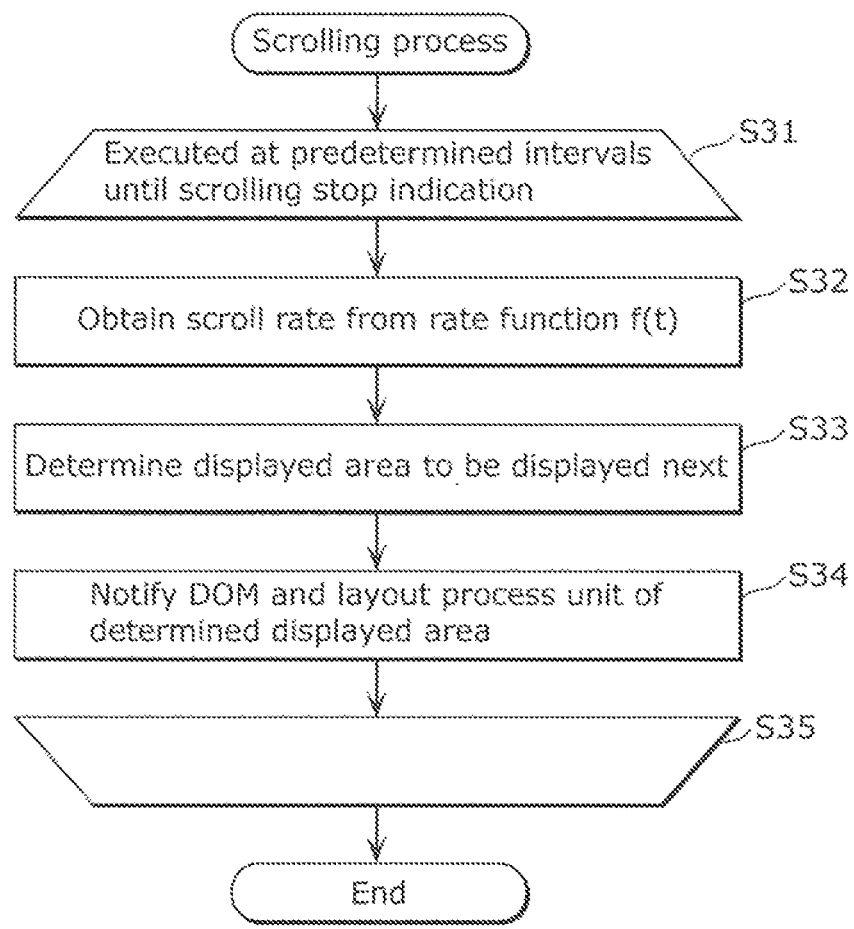
FIG. 6 is a flowchart illustrating a scrolling process.
Figure 8:
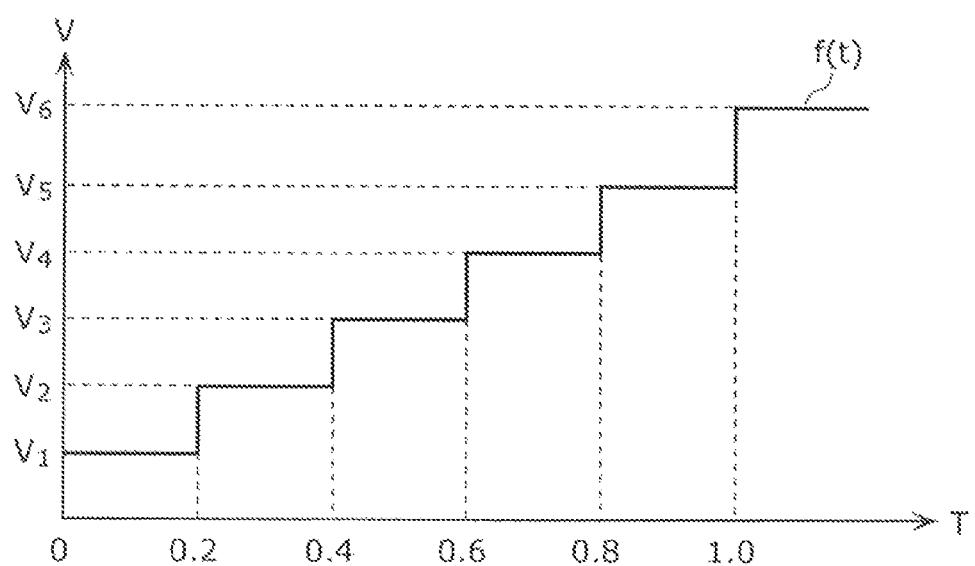
FIG. 8 is a diagram illustrating an example of a rate function f(t) of the scroll rate.

Moreover, if the scrolling start indication is input in step S11 of FIG. 3 (for example, if the directional key on the input device 200 is "long pressed"), the scrolling process is performed (S14). The scrolling process will be described in detail, with reference to FIGS. 6 to 8. FIG. 6 is a flowchart illustrating the scrolling process. FIG. 7 is a diagram showing an example display when the scrolling process is performed. FIG. 8 is a diagram illustrating an example of a rate function f(t) of the scroll rate.

In the following, description will be given where the down directional key on the input device 200 is long pressed (the scrolling start indication is input) in a state where the focus 530 is superimposed on the object 502 as illustrated in the display screen 410 at the bottom left of FIG. 7.

First, the scroll acceleration/deceleration control unit 21 obtains the scroll rate from the rate function f(t) illustrated in FIG. 8 (S32). The rate function f(t) is a step function indicating stepwise acceleration over time. Then, the scroll acceleration/deceleration control unit 21 obtains the rate $V_1$ from the rate function f(t) at the moment of receipt of the scrolling start indication (i.e., time 0).

Next, the scroll acceleration/deceleration control unit 21 determines the displayed area to be displayed next (S33). In other words, the displayed area to be displayed next is an area (not shown) downwardly away from the location $y_0$ of the displayed area 520 shown in FIG. 7 by a distance obtained by multiplying a preset time by the rate $V_1$.

Then, the scroll acceleration/deceleration control unit 21 notifies the DOM and layout process unit 115 of the determined displayed area (S34). Then, steps S32 to S34 described above are repeatedly performed at predetermined intervals (for example, 0.2-second intervals) (S31, S35) during a period from the receipt of the scrolling start indication to the receipt of the scrolling stop indication. This moves the displayed area 520 gradually accelerating from the location (the upper position of the HTML document) $y_0$ to the location resulting in as shown in the display screen 410 at the bottom left of FIG. 7.

Figure 9:
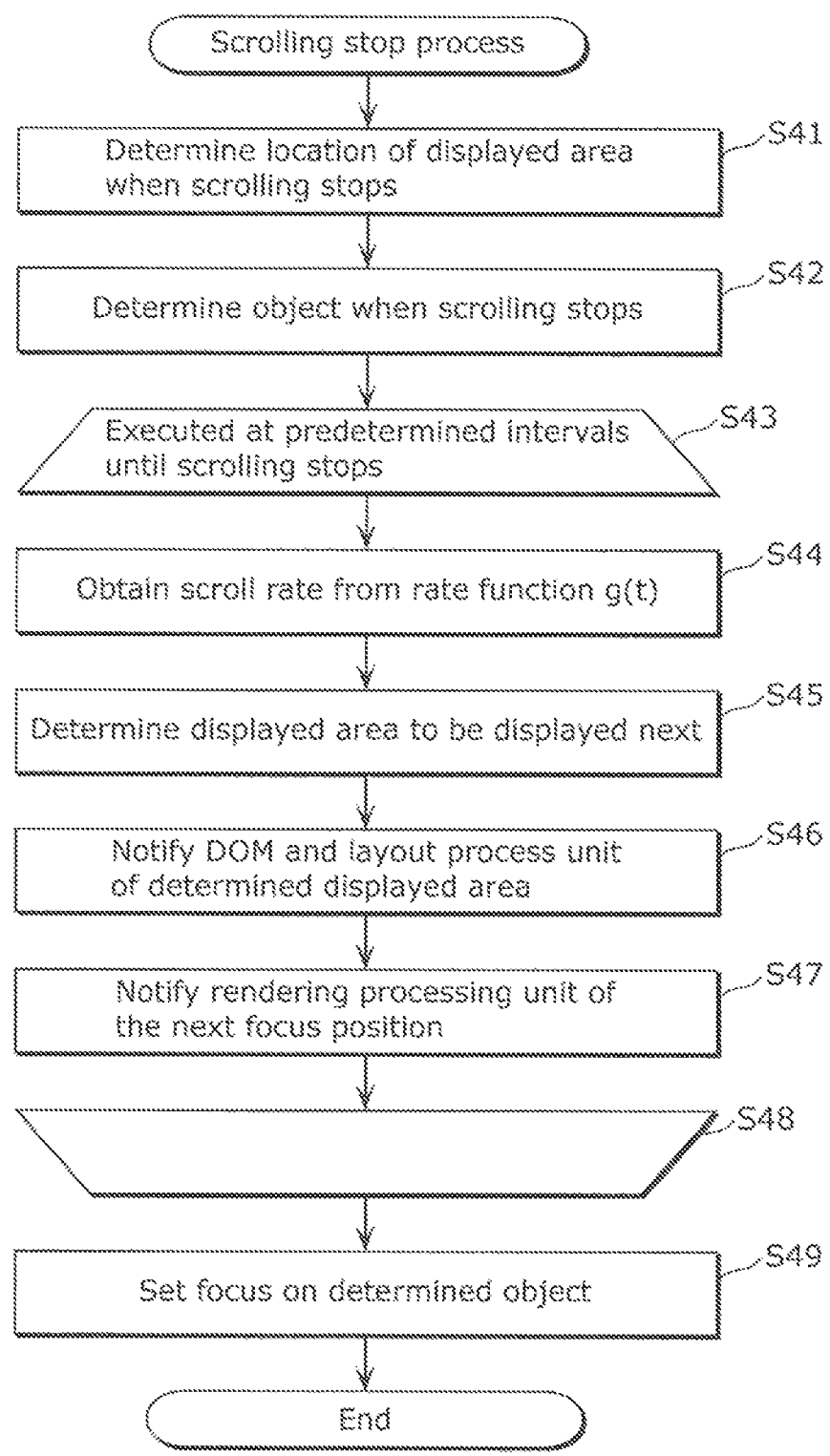
FIG. 9 is a flowchart illustrating a scrolling stop process.
Figure 11:
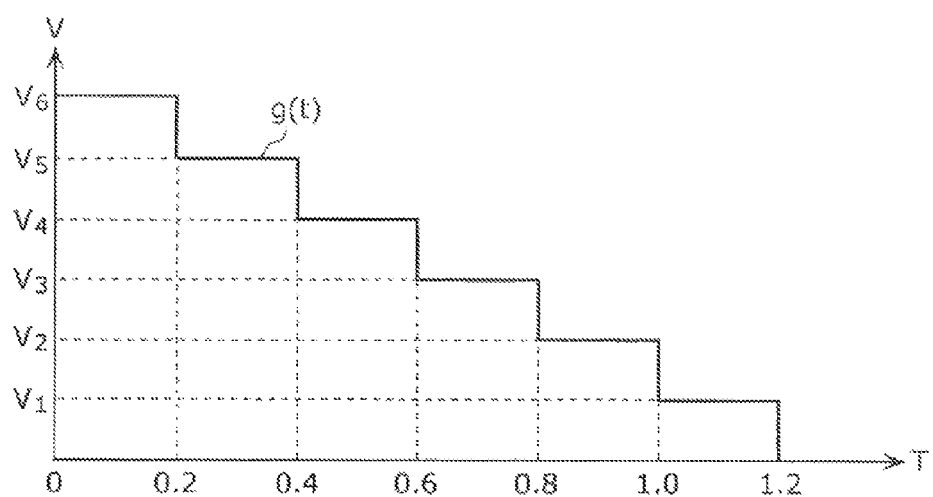
FIG. 11 is a diagram illustrating an example of a rate function g(t) of the scroll rate.
Figure 12A:
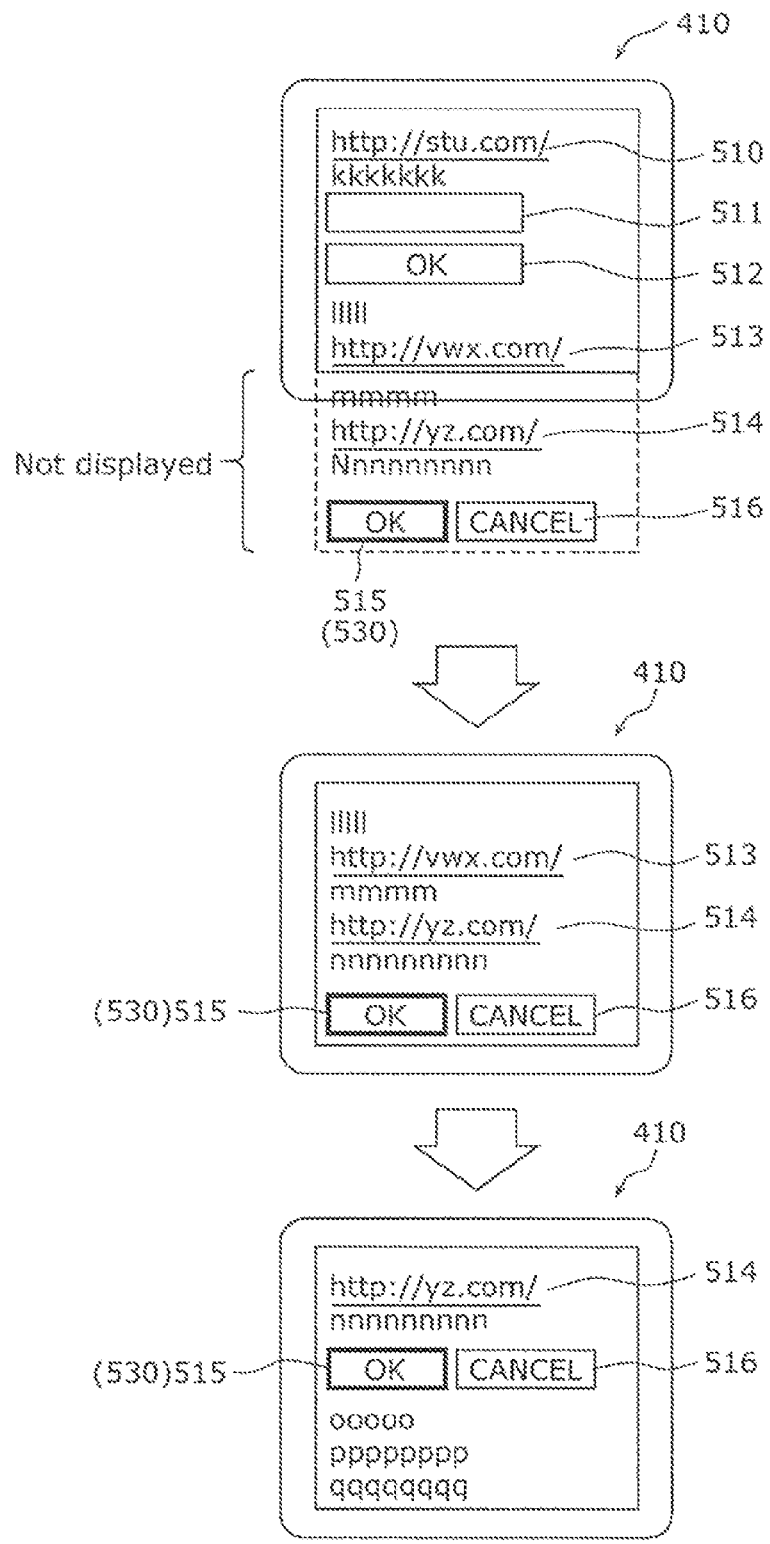
FIG. 12A shows an example display when the focus is not animated.
Figure 12B:
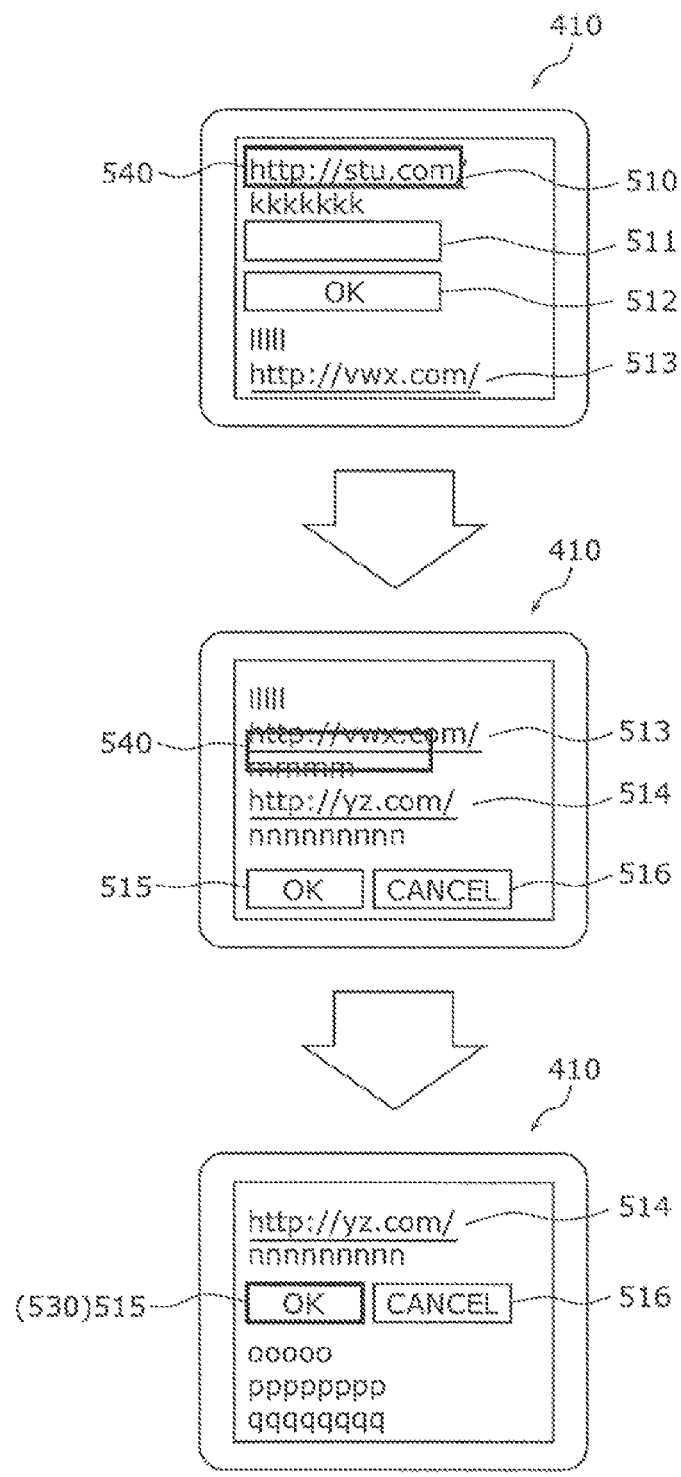
FIG. 12B is a diagram showing an example of an animated focus.

Furthermore, if the scrolling stop indication is input in step S11 of FIG. 3 (for example, on "release of the directional key on the input device 200 from a long press state"), the scrolling stop process is performed (S15). The scrolling stop process will be described in detail, with reference to FIGS. 9 to 12B. FIG. 9 is a flowchart illustrating the scrolling stop process. FIG. 10 is a diagram showing an example display when the scrolling stop process is performed. FIG. 11 is a diagram illustrating an example of a rate function g(t) of the scroll rate. FIG. 12A is a diagram showing an example display where the focus is not animated when the scrolling stop process is performed. FIG. 12B is a diagram showing an example where the focus is animated when the scrolling stop process is performed.

In the following, description will be given where the long press of the down directional key on the input device 200 is released (when the scrolling stop indication is input) in a state where the location of the displayed area 520 is $y_1$ and the scroll rate is $V_3$, as illustrated in the display screen 410 at the top left of FIG. 10.

First, the stop position calculation processing unit 22 determines the location of the displayed area 520 when the displayed area 520 stops scrolling (S41), Specifically, the stop position calculation processing unit 22 calculates, using the following mathematical equation 1, a stop position $y_2$ when scrolling the displayed area is gradually decelerated, based on a current location $y_1$ of the displayed area 520 obtained from the scroll acceleration/deceleration control unit 21, the rate function g(t) illustrated in FIG. 11, a time $T_1$ satisfying $g(T_1)=V_a$ where $V_a$ denotes the current scroll rate, and a time $T_2$ when the rate is 0, i.e., which satisfies $g(T_2)$.

[Math 1]

$$y_2 = y_1 + \int_{T_1}^{T_2} g(t)dt \quad \text{(Eq. 1)}$$

Then, the stop position calculation processing unit 22 notifies the focus position control unit 31 of the calculated stop position $y_2$, For example, provided that $V_1=1000$, $V_2=2000$, $V_3=3000$, $V_4=4000$, $V_5=5000$ (pixel/second), a current location $y_1=4000$, and the current scroll rate is $V_3$ in FIG. 11, the time $T_1$ satisfying $g(T_1)=V_3$ is 0.4 (second), and the time $T_2$ satisfying $g(T_2)=0$ is 1.0 (second). Thus, calculation of the scroll stop position $y_2$ by the following equation 2 results $y_2=4000+0.2V_3+0.2V_2+0.2V_1=5200$ (pixels),

[Math 2]

$$y_2 = 4000 + \int_{0.4}^{1.0} g(t)dt \quad \text{(Eq. 2)}$$

Next, the focus position control unit 31 determines the target object on which the focus 530 is to be superimposed when the displayed area stops scrolling, among the objects 514, 515, and 516 included in the displayed area 520 at the stop position $y_2$ obtained from the stop position calculation processing unit 22 (S42). The focus position control unit 31 may determine, for example, the object 515 which is closest to the center of the displayed area 520 to be the target object.

Next, the focus position control unit 31 instructs the DOM and layout process unit 115 to set the focus on the determined object. If the object 515 is not included in the displayed area 520 at this time point as illustrated in the display screen 410 on the top row of FIG. 12A, the DOM and layout process unit 115 merely holds therein control information which indicates that "the focus 530 is set on the object 515," without actually displaying the focus 530 on the display screen 410.

Next, if the object 515, which is expected to be closest to the center of the screen when the displayed area stops scrolling, appears at the bottom edge of the display screen 410, the focus 530 is rendered being superimposed on the object 515 as illustrated in the display screen 410 in the middle row of FIG. 12A. Then, the displayed area stops scrolling upon arrival of the object 515 having the focus 530 superimposed thereon at the center of the display screen 410 as the display screen 410 at the bottom row of FIG. 12A illustrates. It should be noted that in the example of FIG. 12A, steps S47 and S49 of FIG. 9 may be skipped.

On the other hand, as FIG. 12B shows, if the movement of the focus is animated, rendering of the focus on the determined object may be hidden until the animation ends. An animated focus will be described below.

Next, the scroll acceleration/deceleration control unit obtains the scroll rate from the rate function g(t) illustrated in FIG. 11 (S44). The rate function g(t) is a step function indicating stepwise acceleration over time. Then, the scroll acceleration/deceleration control unit 21 obtains a rate at the moment of receipt of the scrolling stop indication.

It should be noted that if the scroll acceleration/deceleration control unit 21 receives the scrolling stop indication over the course of the scroll acceleration, it is possible that a scroll rate at which moment is not a maximum value of the rate function f(t). Here, it is assumed, by way of example, that the scroll acceleration/deceleration control unit 21 receives the scrolling stop indication at a rate (in this example, $V_3$) slower than the maximum scroll rate (in this example, $V_6$).

Next, the scroll acceleration/deceleration control unit 21 determines a displayed area to be displayed next (S45). In other words, In other words, the displayed area to be displayed next is an area downwardly away from the location $y_1$ of the displayed area 520 shown in FIG. 10 by a distance obtained by multiplying the preset time period by the rate $V_3$ Next, the scroll acceleration/deceleration control unit notifies the DOM and layout process unit 115 of the determined displayed area (S46). Moreover, as described in detail below, the animation control unit 32 notifies the rendering processing unit 120 of the next focus position (S47).

Then, steps S44 to S47 are repeatedly performed at every preset time period (for example, 0.2-second intervals) from the receipt of the scrolling stop indication to when the displayed area stops scrolling (S43, S48). This moves the displayed area 520 gradually accelerating from the location $y_1$ to the location $y_2$. It should be noted that a value of g(t) at the current time may be concurrently calculated during the loop of steps S44 to S47. In the case where g(t) is the step function illustrated in FIG. 11 for example, the concurrent calculation can be achieved by looping the steps at 0.2-second intervals using a timer and subtracting, for each loop, a constant value from a memory or a variable representing the rate until the memory or the variable reaches 0. Values of f(t) and g(t) may be calculated as such by steps of software or a circuit implemented in the scroll acceleration/deceleration control unit 21.

Last, the focus position control unit 31 sets (superimposes) the focus 530 on the object 515 that is determined in step S42, at a time the displayed area stops scrolling, as illustrated in the display screen 410 at the bottom left of FIG. 10 (S49).

Moreover, the pseudo-focus is displayed as shown in FIG. 12B by repeatedly executing step S47 of FIG. 9. Specifically, the animation control unit 32 displays a pseudo-focus 540 at the top edge of the display screen 410 upon receipt of the scrolling stop indication.

Then, the animation control unit 32 gradually brings the position of the pseudo-focus 540 closer to the object 515 gradually brings the position to the center) so that the pseudo-focus 540 is superimposed on the object 515 at a time the displayed area stops scrolling.

Moreover, the animation control unit 32 gradually approximates the shape (the size and shape) of pseudo-animation to the shape of the object 515. For example, the pseudo-focus 540 displayed on the display screen 410 at the top row of FIG. 12B corresponds to the shape of the object 502 on which the pseudo-animation is superimposed at the start of scrolling the displayed area. Then, the closer the pseudo-focus 540 is to the center, the smaller the pseudo-focus 540 is, and has the same shape as that of the object 515 upon the object 515 being superimposed thereon.

It should be noted that the location where the pseudo-focus 540 is initially displayed is not limited to the top edge of the display screen 410. For example, the pseudo-focus 540 may be displayed at the bottom edge of the display screen 410 or at either left or right edge of the display screen 410. Moreover, the location where the pseudo-focus 540 is initially displayed may be changed depending on a direction in which the displayed area scrolls. For example, if the displayed area scrolls downwardly (the down directional key is depressed) the pseudo-focus 540 may be displayed at the top edge of the display screen 410, if the displayed area scrolls upwardly (the up directional key is depressed) the pseudo-focus 540 may be displayed at the bottom edge of the display screen 410.

According to each of the above processing, the following effects can be expected, for example.

First, a known conventional display control device moves a focus in a direction of a directional key depressed, and a displayed area does not scroll until the focus reaches an edge of the screen. In such a display control device, smooth scrolling of the displayed area cannot be achieved, in particular, when a large number of objects are included in content.

In contrast, a display control process according to the present embodiment can separately perform a process of moving a focus within the displayed area (the focus movement process) and a process of sliding the displayed area (the scrolling process). This can achieve smooth scrolling of the displayed area even if a large number of objects are included in content. Moreover, in the scrolling process, the scroll rate is increased over time, thereby quickly arriving at a place of interest even in content that has a large size.

Moreover, immediately after the start of deceleration in scrolling the displayed area, the display control process according to the present embodiment sets the focus on an object that is closest to a predetermined position (typically, the center) when the displayed area stops scrolling. Thus, the focus position can readily be found even after fast scrolling. Moreover, by performing an animated focus during the deceleration in scrolling the displayed area, the focus position is made more recognizable to the user.

Furthermore, the display control process according to the present embodiment can provide the focus movement indication, the scrolling start indication, and the scrolling stop indication, using the same key. Thus, for example, as compared to the case where the indications are assigned to different keys, each process can be performed by simple and intuitive operation. It should be understood that the indications described above are not necessarily assigned to the same key, and may be associated with different keys.

While in the present embodiment, the description has been provided where the focus is moved and the displayed area is started/ended scrolling, using the down directional key, it should be noted that the present invention is not limited thereto. For example, the present invention is applicable to use of the up directional key, the right directional key, and the left directional key for moving the focus and scrolling the displayed area in a direction indicated by each key. Moreover, the present invention is also applicable for moving the focus or scrolling the displayed area in diagonal directions by any combination of (concurrently depressing) the up directional key, the down directional key, the right directional key, and the left directional key.

Furthermore, an input device such as an analog stick or a lever may be used, instead of the directional keys. In other words, the display control device may receive the focus movement indication by a user tilting the analog stick for less than a predetermined time period in a direction the user desires to move the focus, receive the scrolling start indication by the user tilting the analog stick for the predetermined time period or longer in a direction the user desires to scroll the displayed area, and receive the scrolling stop indication by the user releasing the tilt of the analog stick while scrolling the displayed area (returning the analog stick to a neutral position). The same is true for the lever.

Moreover, the scrolling start indication and the scrolling stop indication may be provided by, for example, a drag operation or a flick operation on a touch screen or a touch pad. For example, start of a drag operation or start of a flick operation may be the scrolling start indication, and end of the drag operation or end of the flick operation may be the scrolling stop indication.

FIG. 13 is a diagram showing application of the present embodiment. The display control device (not shown in FIG. 13) 100 according to the present embodiment may be incorporated in, for example, a television 600 which includes a display screen 610. Then, the display control device 100 can receive various instructions from a remote controller 620 and control the display content of the display screen 610.

While in the example of FIG. 13, the display control device and the display device are integral and only the input device is separate, it should be noted that the present invention is not limited thereto. For example, such as a note PC or a mobile terminal represented by a mobile phone and a tablet, all the display control device, the display device, and the input device may be integral. Alternatively, such as a desktop PC, all the display control device, the display device, and the input device may be separate.

(Other Embodiment)

While the present invention has been described, with reference to the above embodiment, it should be noted that the present invention is, of course, not limited to the above-described embodiment. The following cases are also included in the present invention.

Each device described above is, specifically, a computer system which includes a microprocessor, a ROM, a RAM, a hard disk unit, a display unit, a keyboard, a mouse, and so on. A computer program is stored in the RAM or the hard disc unit. By the microprocessor operating in accordance with the computer program, each device achieves its function. Here, the computer program is, to achieve predetermined functionality, configured in combination with a plurality of instruction code indicating instructions to the computer.

Some or all the components included in each device described above may be configured with one system LSI (Large Scale Integration). The system LSI is a super multi-function LSI manufactured by integrating a plurality of components on one chip, and is, specifically, a computer system which includes the microprocessor, ROM, RAM, or the like. The computer program is stored in the RAM. The system LSI achieves its functionality by the microprocessor operating in accordance with the computer program.

Some or all the components included in each of the devices described above may be configured with an IC card or a single module removably attached to each device. The IC card or the module is a computer system which includes a microprocessor, a ROM, a RAM, and the like. The IC card or the module may include the super multi-function LSI described above. The IC card or the module achieves its function by the microprocessor operating in accordance with the computer program. The IC card or the module may be of tamper-resistant.

The present invention may be the methods described above. The present invention may also be a computer program for causing a computer to implement the methods or may be a digital signal which includes the computer program.

It should be noted that each of the components in each embodiment may take the form as dedicated hardware or may be implemented by executing a software program suitable for each component. Each component may be implemented by, CPU or a program execution unit, such as processor, loading and executing a software program stored in a hard disk or a recording medium such as a semiconductor memory, Here, the software program for implementing the display control devices according to each embodiment is as follows.

In other words, the computer program causes a computer to execute a display control method for displaying a displayed area on a display screen, the displayed area being a portion of content including a plurality of objects respectively associated with predetermined processes, the display control method including: (a) receiving, from a user, a scrolling start indication for starting scrolling of the displayed area which is a process of sliding the displayed area on the content, and a scrolling stop indication for stopping the scrolling; (b) decelerating a scroll rate by a predetermined function and pre-calculating a location of the displayed area when the scrolling stops, if the scrolling stop indication is received during the scrolling in step (a); and (c) superimposing a focus on an object, among the plurality of objects, that is closest to a predetermined position within the displayed area, at any time from when the location of the displayed area when the scrolling stops is determined in step (b) to when the scrolling stops, the focus representing that the object is being selected.

Moreover, the present invention may be implemented in a computer-readable recording medium having stored therein a computer program or digital signals, for example, a flexible disk, a hard disk, CD-ROM, MO, DVD, DVD-ROM, DVD-RAM, BD (Blu-ray (registered trademark) Disc), or a semiconductor memory. Alternatively, the present invention may be the digital signal stored in these recording media.

The present invention may transmit the computer program or the digital signals via an electric communication line, a wireless or wired communication line, a network represented by the Internet, data broadcast, or the like.

Moreover, the present invention may be achieved as a computer system which includes a microprocessor and a memory, the memory may store therein the computer program, and the microprocessor operates in accordance with the computer program.

Moreover, by transferring the program or the digital signals stored in the recording medium, or transferring the program or the digital signals via the network or the like, the program or the digital signals may be executed in other independent computer system.

The above embodiments and variations may be combined.

While the display control device and the display control method according to one or more aspects of the present invention have been described with reference to the embodiments, the present invention is not limited to the embodiments. Various modifications to the present embodiments that may be conceived by those skilled in the art and combinations of components of different embodiments are intended to be included within the scope of the one or more aspects of the present invention, without departing from the spirit of the present invention.

INDUSTRIAL APPLICABILITY

The present invention is effectively utilized in a display control device which displays content on a display screen,

REFERENCE SIGNS LIST

10 Input control unit
20 Scroll control unit
21 Scroll acceleration/deceleration control unit
22 Stop position calculation processing unit
30 Focus control unit
31 Focus position control unit
32 Animation control unit
100 Display control device
110 Browser
120 Rendering processing unit
111 Network control unit
112 Parser
113 Display control unit
114 JavaScript (registered trademark) engine
115 DOM and layout process unit
200 Input device
300 Communication network
400 Display device
410 Display screen
500 Content
501, 502, 503, 504, 505, 506, 507, 508, 509, 510, 511, 512, 513, 514, 515, 516, 517 Object
520 Displayed area
530 Focus
540 Pseudo-focus
600 Television
610 Display screen
620 Remote controller

The invention claimed is:

1. A display control device for displaying a displayed area on a display screen, the displayed area being a portion of content including a plurality of objects respectively associated with predetermined processes, the display control device comprising:
   a microprocessor; and
   a memory having stored thereon instructions for instructing the microprocessor to cause the display control device to:
   receive, from a user, a scrolling start indication for starting scrolling of the displayed area which is a process of sliding the displayed area on the content, and a scrolling stop indication for stopping the scrolling;

decelerate a scroll rate by a predetermined function and pre-calculate a location of the displayed area when the scrolling stops, if the microprocessor receives the scrolling stop indication during the scrolling;

superimpose a focus on a specific object, among the plurality of objects, that is to be closest to a predetermined position within the displayed area when the scrolling stops, at any time from when the microprocessor determines the location of the displayed area when the scrolling stops to a time point before the scrolling stops, the focus representing that the specific object is being selected; and scroll the focus and the displayed area simultaneously, without moving the focus of the displayed area from the specific object.

2. The display control device according to claim 1, wherein the memory has stored thereon instructions for instructing the microprocessor to cause the display control device to:

display the focus superimposed on the specific object at a timing when the specific object is displayed at an edge of the display screen, among timings from when the microprocessor determines the location of the displayed area when the scrolling stops to when the scrolling stops, and scroll the focus and the displayed area simultaneously, without moving the focus on the displayed area from the specific object.

3. The display control device according to claim 1, wherein the memory has stored thereon instructions for instructing the microprocessor to cause the display control device, when the microprocessor receives the scrolling start indication, start the scrolling and gradually accelerate a scroll rate to a predetermined rate.

4. The display control device according to claim 3, wherein the scrolling start indication is initiated by the user depressing and holding a directional key on an operating device for a predetermined time period, and the scrolling stop indication is initiated by the user releasing the directional key, and the memory has stored thereon instructions for instructing the microprocessor to cause the display control device to scroll the displayed area in a direction indicated by the directional key.

5. The display control device according to claim 4, wherein the memory has stored thereon instructions for instructing the microprocessor to cause the display control device to receive a focus movement indication for moving the focus, by the user depressing the directional key for less than the predetermined time period, and wherein the memory has stored thereon instructions for instructing the microprocessor to cause the display control device to, if the focus movement indication is received, move the focus from, among a plurality of objects included in the displayed area, a first object currently having the focus superimposed thereon to a second object adjacent to the first object in a direction indicated by the directional key.

6. The display control device according to claim 1, wherein the predetermined position is a center of the displayed area.

7. A display control method for displaying a displayed area on a display screen, the displayed area being a portion of content including a plurality of objects respectively associated with predetermined processes, the display control method comprising:

(a) receiving, from a user, a scrolling start indication for starting scrolling of the displayed area which is a process of sliding the displayed area on the content, and a scrolling stop indication for stopping the scrolling;

(b) decelerating a scroll rate by a predetermined function and pre-calculating a location of the displayed area when the scrolling stops, if the scrolling stop indication is received during the scrolling in step (a); and (c) superimposing a focus on a specific object, among the plurality of objects, that is to be closest to a predetermined position within the displayed area when the scrolling stops, at any time from when the location of the displayed area when the scrolling stops is determined in step (b) to a time point before the scrolling stops, the focus representing that the specific object is being selected, and scrolling the focus and the displayed area simultaneously, without moving the focus on the displayed are from the specific object.

* * * * *